March 31, 1925.
A. L. RUTHVEN
1,531,575
AUTOMATIC POWER CONTROL
Original Filed June 15, 1917  2 Sheets-Sheet 2
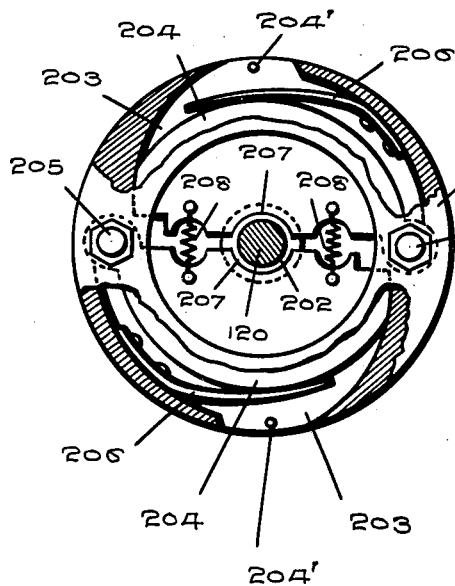
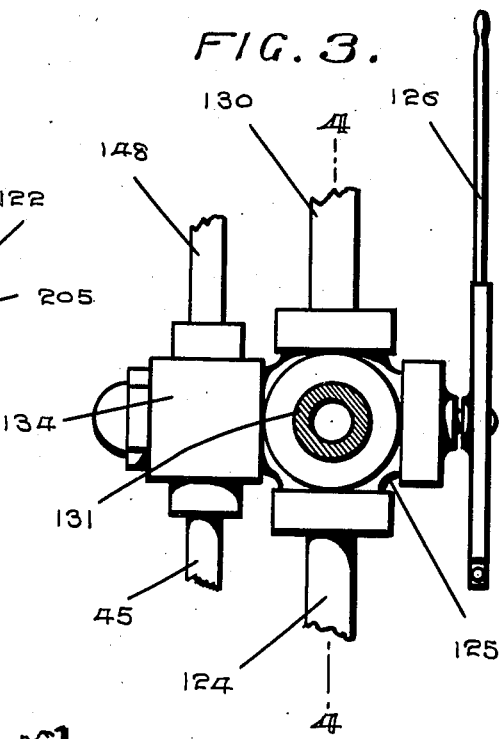
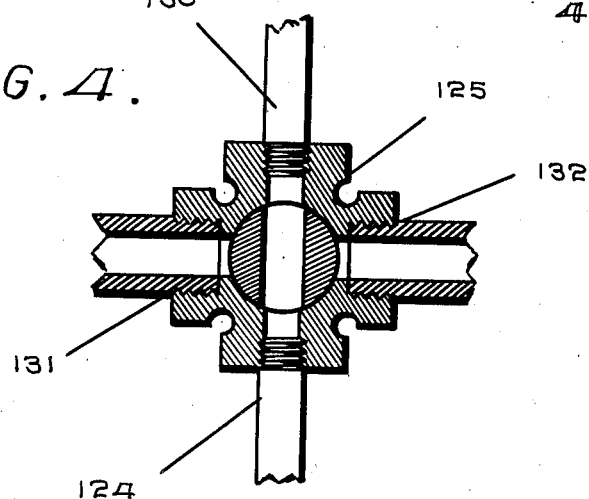
Inventor:
A. L. RUTHVEN,
By Monroe E. Miller
Attorney.

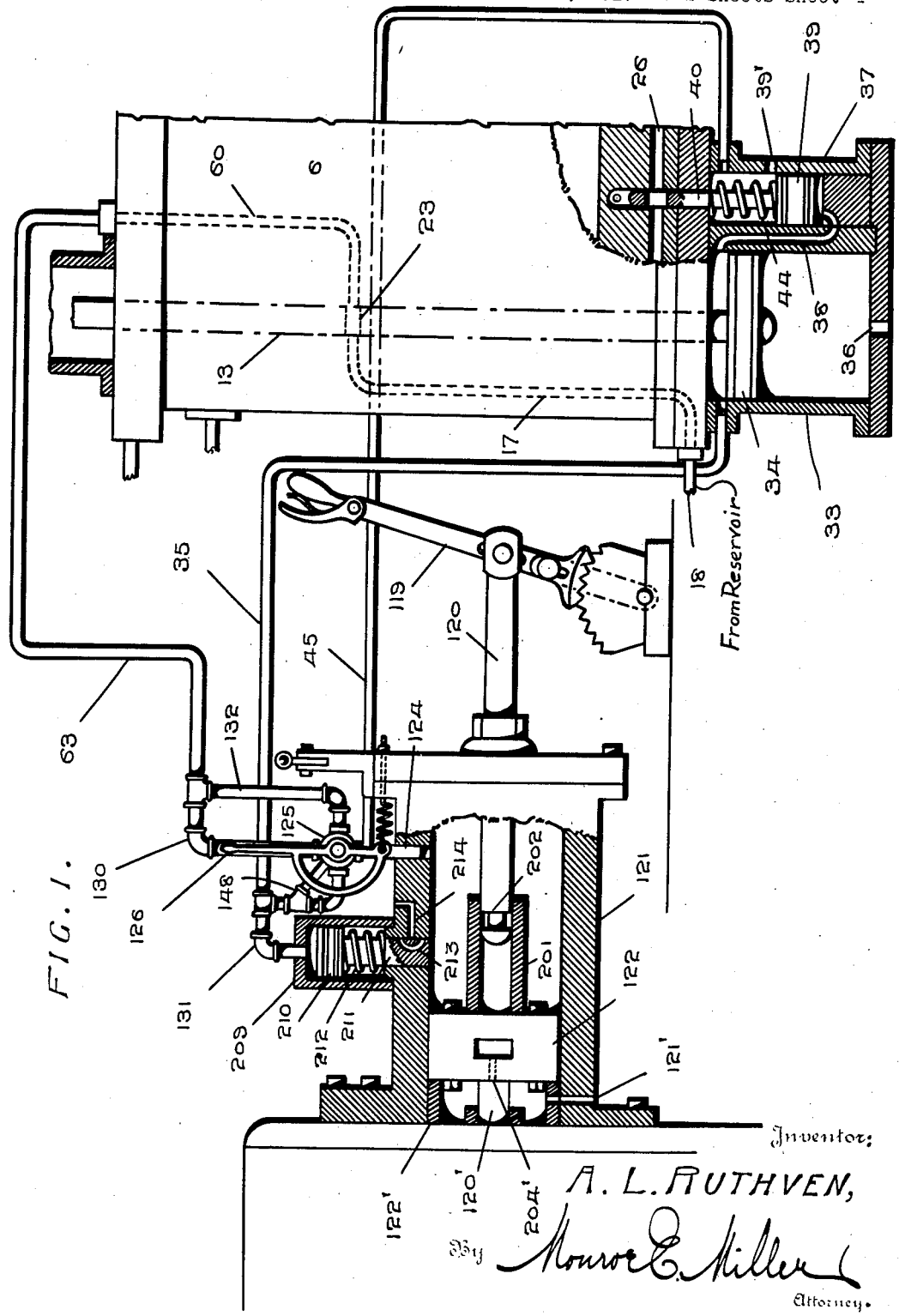

Patented Mar. 31, 1925.

1,531,575

UNITED STATES PATENT OFFICE.

ALFRED L. RUTHVEN, OF ROCHESTER, NEW YORK, ASSIGNOR TO SIMPLEX TRAIN CONTROL CO., INC., OF ROCHESTER, NEW YORK, A CORPORATION OF NEW YORK.

AUTOMATIC POWER CONTROL.

Original application filed June 15, 1917, Serial No. 175,018, Patent No. 1,470,107, dated October 9, 1923. Divided and this application filed June 26, 1922. Serial No. 571,065.

*To all whom it may concern:*

Be it known that I, ALFRED L. RUTHVEN, a citizen of the United States, residing at Rochester, in the county of Monroe and State of New York, have invented certain new and useful Improvements in Automatic Power Controls, of which the following is a specification, reference being had therein to the accompanying drawing.

The present invention relates generally to train controlling apparatus, and appertains more especially to the automatic control of the motive power of the train or vehicle, this application being a division of the application filed June 15, 1917, Serial No. 175,018 (now Patent No. 1,470,107, granted Oct. 9, 1923).

The object of the present invention is the provision of novel and improved means whereby under a certain condition, such as the receiving of a danger signal in the locomotive or vehicle equipment, the control of the power for driving the vehicle is taken away from the engineer or motorman and such power shut off automatically.

Another object is the provision of such a device having a permissive arrangement whereby manual control of the power can again be had, but means being provided whereby the increase in power is limited, in order that only a part of the complete power available can be used, so as not to enable the vehicle to be operated at a high speed, under caution conditions or the like.

It is also an object of the invention to provide such an apparatus having novel and improved features of construction to enhance the utility and efficiency thereof.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a fragmentary elevation of the device, portions being shown in section.

Fig. 2 is an enlarged elevation of the clutch piston, portions being shown in section.

Fig. 3 is an elevation of the permissive control valves.

Fig. 4 is a section on the line 4—4 of Fig. 3.

In the embodiment of the invention as illustrated, the device is employed for interrupting the power and limiting the application of power and speed of the vehicle under other conditions, and although the device is shown and illustrated as being intended for controlling the throttle valve of a steam locomotive, it will be understood that the device can also be used for the control of electric power or other motive power with the same advantages and results.

In the arrangement as shown, the device is operable to limit the movement of the throttle lever under cautions conditions, whereby to prevent the throttle lever being moved to high speed position, and the device is operable under emergency or danger conditions to disconnect the throttle valve stem from the throttle lever and move said stem to close the throttle valve even when the throttle is in high speed position. The throttle lever 119 has a rod 120 connected thereto and projecting slidably through one end of a cylinder 121 which is secured to the boiler or other suitable support, and in which a piston 122 is slidable. The throttle valve stem 120' is secured to the piston 122, and the cylinder 121 has a stop 122' for limiting the movement of the piston 122 when the stem 120' is moved to close the throttle valve. The cylinder 121 has a vent aperture 121' to permit of the ingress and egress of air as the piston 122 is reciprocated. The piston 122 has a sleeve 201 projecting therefrom and slidably receiving the rod 120 whereby to guide said rod, said rod being provided adjacent to its end, which is rounded, with an annular groove 202 for the engagement of a clutch carried by the piston 122. The piston 122 is provided with opposite recesses 203 snugly receiving oscillatory clutch members 204 pivoted at diametrically opposite points, as at 205, to the piston head. The clutch members 204 work snugly within the recesses 203 and close the same, so that pressure fluid in being admitted into the cylinder 121 from a pipe 124 attached thereto, will pass in between the clutch members 204, without passing on through the piston, whereby to force said clutch members 204 outwardly away from one another, the piston 122 having vent apertures 204' communicating with the recesses 203 for permitting the ingress and egress of air to permit the members 204 to move inwardly and outwardly. Leaf springs 206 are carried by the piston and bear against the outer edges of the members 204 to swing said members inwardly toward one another, and the adjacent edges of the members 204 have notches 207 providing portions engageable in the groove 202 of the throttle lever rod 120. Coiled wire retractile springs 208 connect the adjacent edges of the members 204 to assist in swinging them toward one another when the pressure is relieved. Thus, when the pressure is relieved, the throttle lever 119 being moved forwardly will advance the rod 120, so that the rounded end thereof passes between and separates the members 204 which will then snap into the groove 202 to lock the piston 122 to the rod 120. Therefore, when the throttle lever is swung, the piston 122 and throttle valve stem 120' will be moved with the rod 120, so that the engineer can operate the throttle valve as usual. When pressure fluid is admitted into the cylinder 120, however, from the pipe 124, it will separate the clutch members 204 and disengage them from the rod 120, thereby releasing the piston 122 which will be moved by the pressure fluid toward initial position, as seen in Fig. 1, thereby pushing the stem 120' to close the throttle valve. This will interrupt the power immediately, regardless of the position in which the throttle lever is located.

The flow of pressure fluid into the cylinder 121 is controlled by the valve rod 13 mounted in the control casing 6, and reference is had to application Serial No. 175,018 for the details of the mechanism in said casing. Such mechanism does not form a part of the present invention, and need not be shown or described in detail, it being sufficient, for the purposes of the present application, to state that a pipe 18 is connected to the casing 6 for supplying pressure fluid or air from a reservoir, such as the main reservoir of the air brake equipment, to a passage 17 in said casing from which the air flows into another passage 60 in the casing by way of a port 23 in the rod 13 when said rod is in raised position. A pipe 63 is connected to the casing in communication with the passage 60, and the rod 13 has a piston 34 on its lower end working in a cylinder 33. The cylinder 33 has a vent port 36 at the bottom, and there is another cylinder 37 at one side of the cylinder 33 having a piston 39 therein with a valve rod 40 controlling an air passage 26 for producing certain controlling conditions which need not be considered herein. A spring 44 forces the piston 39 down, and the cylinder 37 has a vent port 39'. There is a passage 38 connecting the upper portion of the cylinder 33 and lower portion of the cylinder 37. Pipes 35 and 45 are connected to the cylinders 33 and 37, respectively, in communication with the upper ends thereof.

A pipe 130 is connected to the pipe 63 to receive live pressure fluid from the main reservoir when the rod 13 is raised, and the pipe 130 is connected to the pipe 124 through the intervention of a four-way valve 125 which can be operated by means of a suitable key to connect the lever or handle 126 with the valve member. A pipe 132 connected to the pipe 63 is also connected to the valve 125, as well as a pipe 131. The valve is normally in a position to establish communication between the pipes 130 and 124, so that when pressure fluid flows into the pipe 63 it passes on into the cylinder 121 to release the clutch of the piston 122 and moves said piston to close the throttle valve. When the valve 125 is turned by means of the lever or handle 126, communication between the pipes 124 and 130 is cut off, and communication between the pipes 132 and 131 is then established to bring the speed limit controlling device into operation, as will presently appear.

The speed limit controlling device includes a cylinder 209 attached to and projecting radially from the cylinder 121, and a piston 210 movable in the cylinder 209 and having a stem 211 projecting inwardly through the wall of the cylinder 121 and providing a stop projectable into and retractable from the path of the piston 122. The stem 211 is normally retracted from the cylinder 121 by means of an expansion spring 212 confined between the cylinder 121 and piston 210, thereby to enable the piston 122 to move past the stem 211 under ordinary conditions, without interference. The stem 211 has a by-pass or passage 213 cooperable with a discharge passage 214 with which the cylinder 121 is provided, the passage 214 being normally closed by the stem 211 when retracted, but when the stem 211 is projected into the cylinder 121, the by-pass 213 establishes communication between the interior of the cylinder 121 and the passage 214, to let the pressure fluid escape from the cylinder 121 to the atmosphere so as to permit the clutch of the piston 122 to contract and engage the rod 121 when it is moved into the piston 122. The pipe 131 is attached to the outer end of the cylinder 209, in order that when the valve 125 is operated to open communication between the pipes 132 and 131, pressure fluid will flow from the pipe 63 into the cylinder 209 to force the piston 210 inwardly thereby to project the stem 211 into the cylinder 121. The pipe 35 of the cylinder 33 is also connected to the pipe 131, so that pressure fluid will flow into the upper end of the cylinder 33 and depress the piston 34 on the lower end of the valve rod 13 to restore the rod 13 to normal lowered position after the train has been stopped. Associated with and operated by the valve 125 is a valve 134 to which the pipe 45 of the cylinder 37 is connected, as well as a pipe 148 leading to the pipe 132.

When the track is clear, the rod 13 is in lowermost position, as well as the piston 39, so that any pressure fluid in the cylinder 209 can escape to the atmosphere by way of the pipe 131, pipe 148, valve 134 which is normally open, pipe 45, cylinder 37, and port 39', thus enabling the spring 212 to retract the stem 211. The throttle valve can therefore be operated by the throttle lever as above described. Should the rod 13 be raised, due to an emergency or danger condition, pressure fluid is admitted into the pipe 63 and will flow by way of the pipe 130, valve 125 and pipe 124 into the cylinder 121, releasing the clutch from the rod 120, and moving the piston 122 and valve stem 120' to close the throttle valve and cut off the power. In order to proceed under caution conditions, the valve 125 must be operated through the medium of the lever or handle 126 by the assistance of a proper key, to cut off communication between the pipes 130 and 124, so as to cut off the flow of pressure from the cylinder 121, and pressure fluid will then flow from the pipe 132 into the pipe 131 and cylinder 209, to move the piston 210, and thereby project the stem 211 into the cylinder 121. The pressure fluid can then escape from the cylinder 121 to the atmosphere by way of the by-pass 213 and passage 214, which permits the clutch members 204 to move toward one another and take hold of the rod 120 when it is moved into the piston 122. The engineer then again has control of the throttle valve, but the piston 122 can be moved but a limited distance, since the piston will strike the projected stem 211, which prevents the throttle lever from being moved beyond a certain point, and permits of only a slow rate of speed, since the flow of steam is restricted. The engineer, however, can move the throttle lever to closing position to stop the train, and can advance the throttle lever a limited distance without interference. After the track is cleared, the apparatus can be restored to normal position by returning the valve 125 to normal position by means of the lever or handle 126 and the proper key. When the pressure fluid is discharged from the cylinder 121 through the by-pass 213 and passage 14, during the time that the piston 210 is depressed to limit the application of power, the pressure in the cylinder is reduced to atmospheric pressure. Therefore, when the apparatus is restored to normal position, with the rod 13 moved to shut off the flow through the passage 60 and pipe 63, the valve stem 125 can then be moved with the rod 120 for the full application of power. Any compression of the fluid within the cylinder 121, during the normal operation of the throttle valve, will not be sufficient to open the clutch between the rod 120 and piston 122.

With the above-described construction, it will be noted that when pressure fluid is admitted into the cylinder 209 from the pipe 131, the pressure fluid will also flow through the pipe 35 into the upper end of the cylinder 33, to depress the piston 34 and restore the rod 13 to normal lowered position. Air will also flow by way of the passage or by-pass 38 into the lower end of the cylinder 37 to raise the piston 39 and close the passage 26 so as to prevent the flow of pressure fluid through the passage 26, and to provide certain controlling conditions, as disclosed in the aforesaid application, when the valve 125 and valve 134 are restored to normal position under clear conditions, the pressure fluid will drain from the cylinders 33 and 37, as well as from the cylinder 209, through the pipes 148 and 45 into the cylinder 37 and out through the port 39'. Thus all parts are restored to normal position.

The rod 120' instead of controlling the throttle of a steam locomotive, can control an electrical controller of an electrically propelled locomotive or vehicle, or may control other motive power, so that when there is an emergency condition, the control of the power is disconnected from the hand lever or manual controlling member and the power is shut off, and when the permissive control is had, the power can only be applied and increased to a limited or restricted amount, in order to permit the vehicle to proceed under a limited speed only.

Having thus described the invention, what is claimed as new is:—

1. In combination, a controlling member for the motive power of a vehicle, an operating member, said members having portions to engage one another in any position of the controlling member for moving the controlling member with the operating member, and means operable for disconnecting said members and moving the controlling member to shut off the power.

2. In combination, a controlling member for the motive power of a vehicle, an operating member, a clutch connecting said members for the movement of the controlling member by the operating member, and means operable for opening said clutch to disconnect said members and to move the controlling member to shut off the power.

3. In combination, a controlling member for the motive power of a vehicle, an operating member, said members having portions to engage one another in any position of the controlling member for moving the controlling member with the operating member, and pressure fluid operated means for disconnecting said members and for moving the controlling member to shut off the power.

4. In combination, a controlling member for the motive power of a vehicle, an operating member, a pressure fluid operated clutch for connecting said members, and means for the supply of pressure fluid to open said clutch to disconnect said members and for moving the controlling member to shut off the power.

5. In combination, a controlling member for the motive power of a vehicle, an operating member, a pressure fluid cylinder, a piston connected to the controlling member and working in said cylinder, a clutch carried by the piston for the connection of the operating member, and means for admitting pressure fluid into said cylinder for moving the piston and controlling member to shut off the power, said clutch being arranged to be opened by the pressure fluid for disconnecting the operating member from said piston and controlling member.

6. In combination, power controlling means for a vehicle, manual operating means for said controlling means, automatic means for operating the controlling means for shutting off the power, and means for connecting the power controlling and manual operating means in any position of the power controlling means and operable to disconnect said power controlling and manual operating means when the third named means is operative.

7. In combination, power controlling means for a vehicle for applying and shutting off the power, and means operable under predetermined conditions and controlling said power controlling means for permitting the application of power to a limited extent only after the power is shut off by the first named means.

8. In combination, a movable controlling member for the motive power of a vehicle movable in one direction for applying the power and movable in another direction for shutting off the power, and means operable under predetermined conditions, after said controlling member is moved to shut off the power, for allowing a limited movement of said member in the firstnamed direction for the application of power and restricting the amount of power that can be applied.

9. In combination, a controlling member for the motive power of a vehicle movable in opposite directions for applying and shutting off the power, a stop to limit the movement of said member in the direction to apply the power and to thereby restrict the amount of power that can be applied, and means for projecting and retracting said stop.

10. In combination, a cylinder, a piston working in the cylinder, power controlling means for a vehicle controlled by said piston for applying the power when the piston moves in one direction and for shutting off the power when the piston moves in the opposite direction, and a stop projectable into said cylinder for limiting the movement of the piston in the direction to apply the power so as to restrict the amount of power that can be applied.

11. In combination, power controlling means for a vehicle, operating means for said controlling means, means operable for disconnecting said means and controlling the controlling means for shutting off the power, and means controlling the third-named means for permitting the control of the controlling means by the operating means and limiting the application of power.

12. In combination, a movable controlling member for the motive power of a vehicle, an operating member for moving the controlling member, means operable for disconnecting said members and moving the controlling member to shut off the power, and means controlling the aforesaid means for permitting the movement of the controlling member by the operating member and limiting the movement of the controlling member for restricting the application of power.

13. In combination, a power controlling member for a vehicle, an operating member for moving said member, a clutch connecting said members, means operable for the opening of said clutch to disconnect the members and for moving the controlling member to shut off the power, and permissive means controlling the aforesaid means and clutch for permitting said members to be connected by the clutch and for limiting the movement of the controlling member and restricting the application of power.

14. In combination, a controlling member for the motive power of a vehicle, an operating member for moving said member, a clutch for connecting said members adapted to be opened by pressure fluid, means for supplying pressure fluid for opening the clutch and moving the controlling member to shut off the power, and means operable for relieving the pressure for the closing of the clutch and the connection of said members, and for the movement of the controlling member, the lastnamed means also being operable for limiting the movement of the controlling member and restricting the application of power.

15. In combination, a power controlling member for a vehicle, an operating member for moving said controlling member, a cylinder, a piston working in the cylinder and connected to the controlling member, a clutch carried by the piston for the connection of the operating member and adapted to be opened by pressure fluid in said cylinder, means for admitting pressure fluid to the cylinder for opening the clutch and moving the piston and controlling member to shut off the power, and means operable for relieving the pressure in the cylinder for the closing of the clutch and for the connection of said members and the movement of said piston and controlling member, said means also limiting the movement of said piston and controlling member and restricting the application of power.

16. In combination, a power controlling member for a vehicle, an operating member for moving said member, a cylinder, a piston working in the cylinder and connected to the controlling member, a clutch carried by the piston for the engagement of the operating member and adapted to be opened by pressure fluid in said cylinder, means for admitting pressure fluid into the cylinder for opening the clutch and moving the piston and controlling member to shut off the power, and a stop projectable into the cylinder for limiting the movement of the piston and controlling member and restricting the application of power, said stop having means for the escape of the pressure fluid from the cylinder so that the clutch can be closed for the connection of said members.

17. In combination, power controlling means for a vehicle operable for applying and shutting off the power, means operable automatically to control said means and operate it to shut off the power, and other means operable permissively for permitting the control of said controlling means to operate it for applying the power and limiting such operation of the controlling means so as to restrict the amount of power that can be applied.

18. In combination, power controlling means for a vehicle operable for applying and shutting off the power, means for supplying pressure fluid to control said means for shutting off the power, and permissive means for relieving the pressure so that the power can be applied and limiting the operation of the power controlling means so as to restrict the amount of power that can be applied.

19. In combination, power controlling means for a vehicle operable for applying and shutting off the power, means for supplying pressure fluid to control said means for shutting off the power, said controlling means including a movable member movable in opposite directions for applying and shutting off the power, and permissive means operable for relieving the pressure and limiting the movement of said member in a direction to apply the power so as to restrict the amount of power that can be applied.

20. In combination, power controlling means for a vehicle including a piston movable in opposite directions for applying and shutting off the power, a cylinder in which said piston works, means for supplying pressure fluid into said cylinder for moving the piston in a direction to shut off the power, and permissive means for relieving the pressure in said cylinder and limiting the movement of the piston in a direction to apply the power so as to restrict the amount of power that can be applied.

21. In combination, power controlling means for a vehicle, operating means, pressure fluid operated means for moving the controlling means for shutting off the power, and means for connecting the power controlling and operating means in any position of the power controlling means for moving the power controlling means with the operating means and operable to disconnect said means whenever the third named means is subjected to fluid pressure.

In testimony whereof I hereunto affix my signature.

ALFRED L. RUTHVEN.